March 24, 1964

A. A. KUCHER 3,126,169

AIRCRAFT

Filed April 2, 1962

ANDREW A. KUCHER
*INVENTOR.*

BY John R. Faulkner
Thomas H. Oster

ATTORNEYS

March 24, 1964     A. A. KUCHER     3,126,169
AIRCRAFT

Filed April 2, 1962                           4 Sheets-Sheet 2

ANDREW A. KUCHER
*INVENTOR.*

BY John R. Faulkner
Thomas H. Oster
ATTORNEYS

United States Patent Office 3,126,169
Patented Mar. 24, 1964

3,126,169
AIRCRAFT
Andrew A. Kucher, Dearborn, Mich., assignor to Ford Motor Company, Dearborn, Mich., a corporation of Delaware
Filed Apr. 2, 1962, Ser. No. 186,295
8 Claims. (Cl. 244—12)

This invention relates to the field of air travel and is especially directed to a novel and highly useful aircraft which is devoid of landing gear and wings as the terms are employed in the art.

This application is a continuation-in-part of copending application S.N. 843,992, filed October 2, 1959, now abandoned, for an Aircraft.

Five figures of the drawings have been prepared to aid in an understanding of the construction and operation of this novel aircraft. In these drawings.

Figure 1:
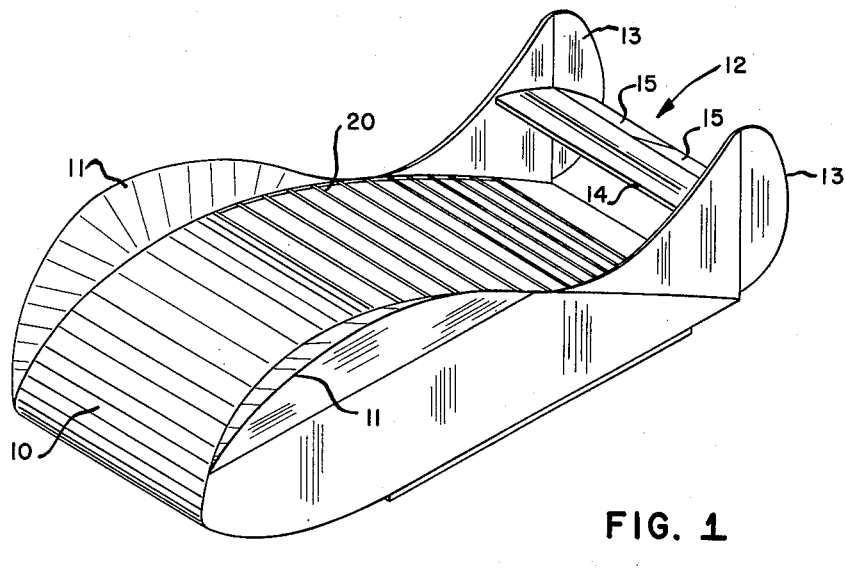
FIGURE 1 is a perspective view looking at the upper portion of the aircraft.
Figure 2:
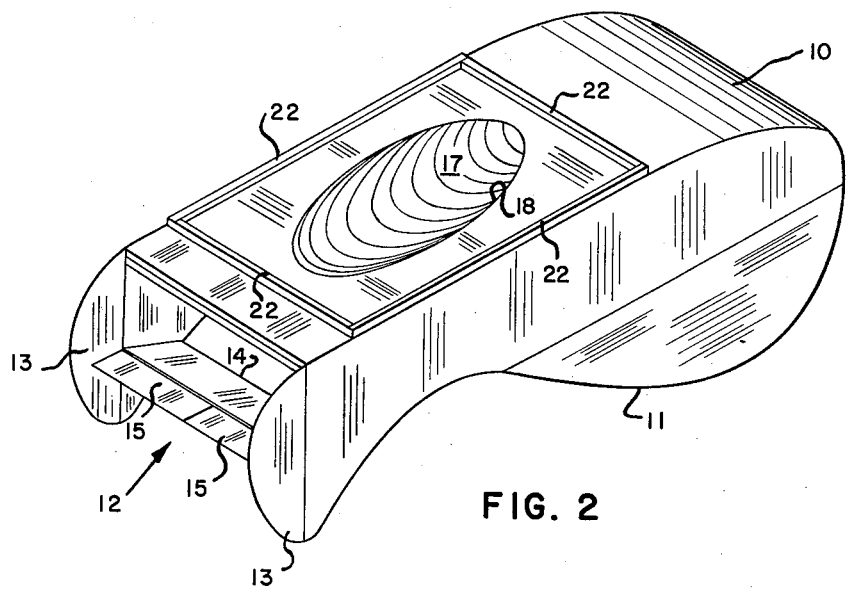
FIGURE 2 is a similar perspective view except that the underside of the aircraft is shown.

From FIGURES 1 and 2 it can readily be determined that the aircraft in general comprises an airfoil shaped body designated by the numeral 10 to which are secured dual stabilizing members 11 and a dual empennage 12 which supports rudders 13, horizontal stabilizer 14 and a pair of separately controllable elevators 15.

Figure 3:
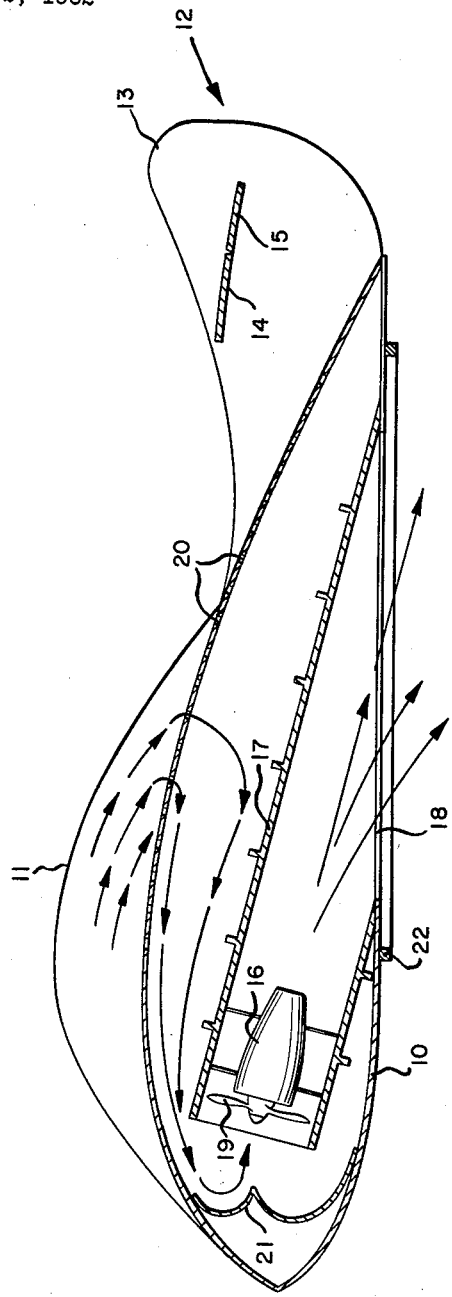
FIGURE 3 is a longitudinal cross section view of the aircraft depicting the propulsion system.

The propulsive system is best understood from a study of FIGURE 3. The aircraft is propelled by prime mover 16 which is supported within duct 17 which terminates in opening 18. Prime mover 17 may be a conventional internal combustion engine or a gas turbine or any other source of mechanical power having a high ratio of power to weight. Prime mover 16 drives a propeller 19.

The upper surface of the airfoil which comprises body 10 is provided with a series of laterally extending slot-like openings 20 as seen in FIGURES 1 and 3. These laterally extending slot-like openings 20 serve to admit to the interior of the otherwise closed airfoil shaped body 10 a voluminous stream of air which actually lifts and propels the aircraft. This propulsive and lifting stream of air is generated by the action of propeller 19 and as indicated by the arrows in FIGURE 3 enters through laterally extending slot-like openings 20, is reversed in direction by deflector 21, flows past propeller 19 through duct 17 and emerges through opening 18 at an angle selected to impart both a vertical and horizontal component to the air stream.

When prime mover 16 is initially activated with the aircraft at rest, a levitating column of air is first created within the area defined by strip members 22 which are secured to the under surface of the airfoil which comprises body 10. This structure is shown in FIGURE 2. This levitating column of air serves to lift the aircraft slightly clear of the earth so that a very slight forward thrust will serve to accelerate the aircraft in a forward direction.

As the aircraft gains speed, the lifting action of the airfoil section of the body will become increasingly effective in providing lift to the aircraft. When this aerodynamic lift has become equal to the weight of the aircraft minus the vertical thrust component of the propulsive and lifting stream, the aircraft will become completely airborne and capable of free flight.

To accomplish a landing, the above procedure need only be reversed. The speed of the aircraft is reduced as the ground is approached until the aerodynamic lift of the airfoil section plus the vertical thrust component of the propulsive and lifting stream is just less than the weight of the aircraft. As the aircraft closely approaches the ground, the levitating pad defined by strip members 22 will take over the support of the aircraft. By proper control of prime mover 16, the force with which the aircraft is levitated can be gradually decreased until actual contact is made between strip members 22 and the ground and the aircraft slows to a stop.

Figure 4:
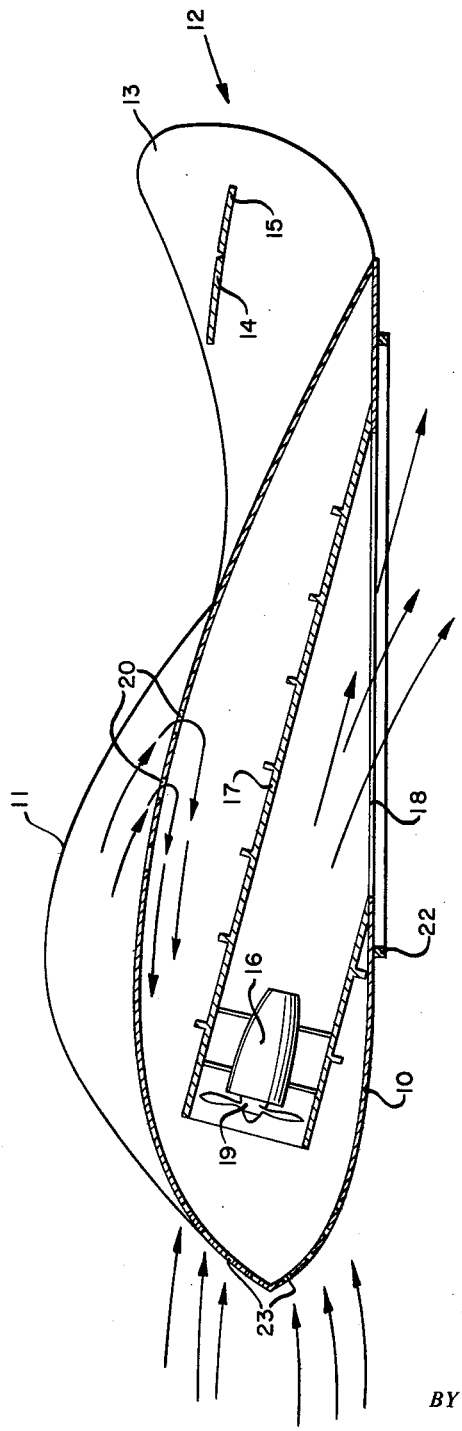
FIGURE 4 is a longitudinal cross section view similar to FIGURE 3 and illustrating a modification of the air induction system.

For operation at high speeds, it is necessary that the drag inherent in the operation of any airfoil be reduced to a minimum. FIGURE 4 of the drawings illustrates a structure which has been modified to reduce the drag below that which results from the structure depicted in FIGURE 3. In the structure of FIGURE 4, the stream of air necessary for propulsion, levitation and the operation of the power plant is inducted through openings 23 in the leading edges of the airfoil. Actual wind tunnel tests of the modification employing leading edge induction of air shows a much lower drag than the structure in which the air is inducted through openings in the rear upper surface of the airfoil as shown in FIGURE 3.

A combination of the structures shown in FIGURES 3 and 4 may readily be operated and will demonstrate characteristics intermediate these two structures. Such a device will be equipped with openings for the induction of air both in the leading edges of the airfoil as shown in FIGURE 4 and with other openings in the upper section of the airfoil as shown by FIGURE 3. For best operation of this intermediate structure, the size and operating characteristics of the prime mover and propeller should be related to the size and number of openings 23 in the leading edges of the airfoil so that the pressure maintained within the interior of the airfoil is less than that existing at openings 20 in the upper surface of the airfoil so that the flow of air will be inward through these openings and not outward. Any outward flow here would cause an unnecessary loss in lift.

Figure 5:
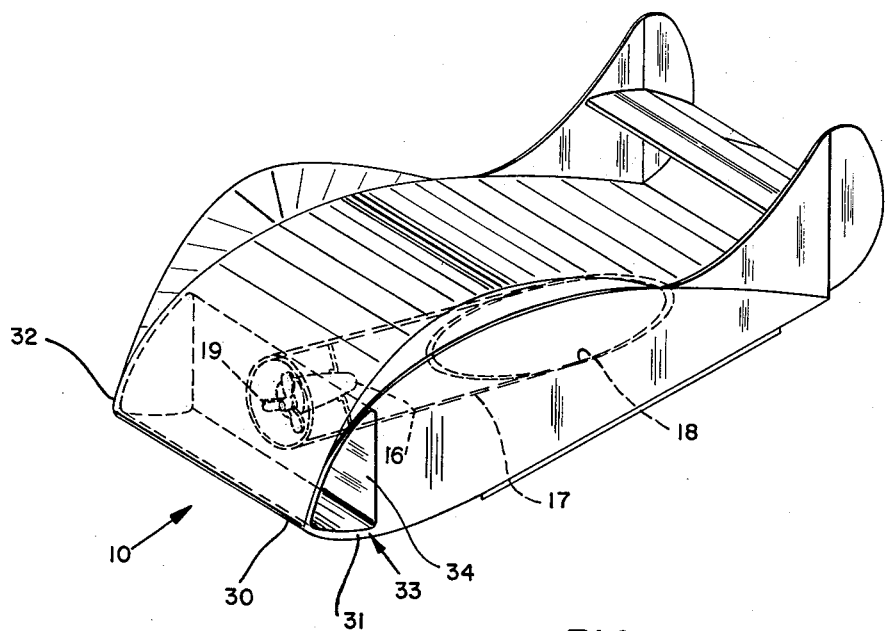
FIGURE 5 is a perspective view of an alternate embodiment of the invention.

FIGURE 5 shows an alternate embodiment of the invention wherein the airfoil shaped body 10 has a frontal portion 30 which is formed to provide the side air inlets 31 and 32. The side air inlets 31 and 32 are formed by the curved wall 33 and the vertical wall 34. The prime mover 16 and the propeller 19 are located adjacent to the vertical wall 34. In operation, the embodiment causes streams of air to flow through the side air inlets 31 and 32 and through the duct 17 and out the opening 18, whereby the body 10 is moved horizontally and vertically. The operation of the embodiment in its other aspects is the same as the embodiments shown in FIGURES 1-4.

All of the openings for the admission of air to the body have been shown in the preferred form, that is as laterally extending slots. However, it is to be understood that any structurally acceptable geometry of these slots may be employed without departing from the spirit of the invention.

I claim:

1. An aircraft comprising a substantially closed body shaped to the configuration of an airfoil, openings in the body of the airfoil surface for the admission to the body of substantially all of the air comprising a lifting and propulsive air stream, a duct for the expulsion of said air stream from the lower surface of the airfoil in a direction having a rearward and downward component, said duct extending a substantial portion of the length of the body and being inclined downwardly towards the aft portion of the body and a prime mover and propeller located within said duct for the propulsion of said lifting and propulsive stream of air, said stream of air entering the body at the openings in the airfoil surface and flowing rearwardly through said duct past the prime mover and propeller and out of the body.

2. An aircraft comprising a substantially closed body shaped to the configuration of an airfoil, said body having a longitudinal axis and enclosing an air propelling means for the impelling of a lifting and propulsive stream of air, openings in the body of the airfoil surface for the admission to the body of substantially all of the air comprising said lifting and propulsive air stream, and duct means for the expulsion of said air stream from the lower surface of the airfoil and in a direction having a rearward and downward component, said duct means communicating with said openings in the body of the airfoil and extending a substantial length along the longitudinal axis of said body and making an angle with said longitudinal axis.

3. An aircraft comprising a substantially closed body shaped to the configuration of an airfoil, said body having a longitudinal axis and enclosing air propelling means for the impelling of a lifting and propulsive stream of air, said body having a frontal portion which is formed to have openings therein, said openings in the frontal portion of said body for the admission to the body of substantially all of the air comprising said lifting and propulsive air stream, and duct means for the expulsion of said air stream from the lower surface of the airfoil and in a direction having a rearward and downward component, said duct means communicating with said openings in the frontal portion of said body and extending a substantial length along the longitudinal axis of said body.

4. An aircraft comprising a substantially closed body shaped to the configuration of an airfoil, said body having a longitudinal axis and enclosing air propelling means for the impelling of a lifting and propulsive stream of air, said body having a frontal portion which is formed to have an opening on each side, said openings in the frontal portion of said body for the admission to the body of substantially all of the air comprising said lifting and propulsive air stream, and duct means for the expulsion of said air stream from the lower surface of the airfoil and in a direction having a rearward and downward component, said duct means communicating with said openings in the frontal portion of said body and extending a substantial length along the longitudinal axis of said body.

5. An aircraft comprising an air propelling means for the impelling of a lifting and propulsive stream of air, a substantially closed body shaped to the configuration of an airfoil, said body having a longitudinal axis and enclosing air propelling means, said body having a frontal portion which is formed to have openings therein, said openings in the frontal portion of said body for the admission to the body of substantially all of the air comprising said lifting and propulsive air stream, and duct means for the expulsion of said air stream from the lower surface of the air foil and in a direction having a rearward and downward component, said duct means communicating with said openings in the frontal porton of said body and said air propelling means, and extending a substantial length along the longitudinal axis of said body.

6. An aircraft comprising a substantially closed body shaped to the configuration of an airfoil, openings in the body in the upper airfoil surface for the admission to the body of substantially all of the air comprising a lifting and propulsive air stream, a duct for the expulsion of the said air stream from the lower surface of the airfoil in a direction having a rearward and downward component, said duct extending a substantial portion of the length of the body and being inclined downwardly towards the aft portion of the body and a prime mover and propeller located within said duct for the propulsion of said lifting and propulsive stream of air, said propulsive and lifting stream of air entering the body at the openings in the upper airfoil surface, and flowing forwardly outside of said duct, then rearwardly through said duct past said prime mover and propeller and out of the body.

7. An aircraft comprising a substantially closed body shaped to the configuration of an airfoil, openings in the body in the upper airfoil surface for the admission to the body of substantially all of the air comprising a lifting and propulsive air stream, a duct for the expulsion of the said air stream from the lower surface of the airfoil in a direction having a rearward and downward component, said duct extending a substantial portion of the length of the body and being inclined downwardly towards the aft portion of the body, an air stream reflector located directly forward of the forward opening of said duct, and a prime mover and propeller located within said duct for the propulsion of the lifting and propulsive stream of air, said propulsive and lifting stream of air entering the body at the openings in the upper airfoil surface, flowing forwardly outside of said duct, reversing in direction at the reflector, then flowing rearwardly through said duct past said prime mover and propeller and out of the body.

8. An aircraft comprising a substantially closed body shaped to the configuration of an airfoil, openings in the body of the airfoil for the admission into the body of substantially all of the air comprising a lifting and propulsive air stream, a duct for the expulsion of said air stream from the lower surface of the airfoil in a direction having a rearward and downward component, said duct extending a substantial portion of the length of the body and being inclined downwardly toward the aft portion of the body, a levitating pad surrounding the duct on the lower surface of the airfoil and a prime mover and propeller located within said duct for the propulsion of said lifting and propulsive stream of air, said propeller housing having an axis that is substantially aligned with the duct axis, said stream of air entering the body at the openings in the airfoil and flowing rearwardly through said duct past the prime mover and propeller and out of the body through the levitating pad.

References Cited in the file of this patent
UNITED STATES PATENTS

| | | |
|---|---|---|
| 2,730,311 | Doak | Jan. 10, 1956 |
| 2,867,392 | Lear | Jan. 6, 1959 |